(12) United States Patent
Cutler (10) Patent No.: US 7,298,392 B2
(45) Date of Patent: Nov. 20, 2007

(54) OMNI-DIRECTIONAL CAMERA DESIGN FOR VIDEO CONFERENCING

(75) Inventor: Ross Cutler, Duvall, WA (US)

(73) Assignee: Microsoft Corp., Redmond, WA (US)

( * ) Notice: Subject to any disclaimer, the term of this patent is extended or adjusted under 35 U.S.C. 154(b) by 813 days.

(21) Appl. No.: 10/608,363

(22) Filed: Jun. 26, 2003

(65) Prior Publication Data

US 2004/0263611 A1    Dec. 30, 2004

(51) Int. Cl.
*H04N 7/00*     (2006.01)
*G02B 17/00*    (2006.01)
(52) U.S. Cl. .................. 348/36; 359/403; 359/726
(58) Field of Classification Search ............ 348/36, 348/14.08; 359/725
See application file for complete search history.

(56) References Cited

U.S. PATENT DOCUMENTS 6,011,558 A * 1/2000 Hsieh et al. ............ 345/629
6,128,143 A * 10/2000 Nalwa ..................... 359/725
6,141,145 A * 10/2000 Nalwa ..................... 359/403
6,677,981 B1 * 1/2004 Mancuso et al. ........ 348/36
6,809,887 B1 * 10/2004 Gao et al. ................ 359/725
7,015,954 B1 * 3/2006 Foote et al. ............. 348/218.1
7,116,351 B2 * 10/2006 Yoshikawa ............... 348/36

* cited by examiner

*Primary Examiner*—Gims Philippe
*Assistant Examiner*—Erick Rekstad
(74) *Attorney, Agent, or Firm*—Lyon & Harr, LLP; Katrina A. Lyon (57) ABSTRACT

An omni-directional camera array that is very small and unobtrusive and allows for higher pixel resolution for the face of meeting participants sitting or standing around a conference room table, as would be typical in a video conferencing situation. The camera system of the invention uses N cameras and an N sided mirror to capture images of the surrounding scene. The cameras are arranged to have a small distance between their virtual centers of projection. The images from the N cameras are stitched together to create a 360-degree panorama using a calibration surface. To stitch the images together in real-time, a static image stitcher is used, which stitches images together perfectly for objects on a calibration surface. The calibration surface is typically defined by the boundary of the table the camera is sitting on.

23 Claims, 8 Drawing Sheets

OMNI-DIRECTIONAL CAMERA DESIGN FOR VIDEO CONFERENCING

BACKGROUND

1. Technical Field

This invention is directed toward a new camera design. More specifically, this invention is directed toward a new omni-directional camera design that provides an improved viewpoint for video capture of meetings compared to prior camera designs.

2. Background Art

Video conferencing systems have had limited commercial success. This is due to many factors. In particular, there are numerous technical deficiencies in the video conferencing systems to date. Poor camera viewpoints and insufficient image resolution make it difficult for meeting participants to see the person speaking. This is compounded by inaccurate speaker detection (especially for systems with pan-tilt-zoom cameras) that causes the camera not to be directed at the person speaking. Additionally, poor video compression techniques often result in poor video image quality and a "choppy" image display.

Three common methods exist to capture video data: pan/tilt/zoom (PTZ) cameras, mirror-based omni-directional cameras, and camera arrays. While PTZ cameras are currently the most popular choice, they have two major limitations. First, they can only capture a limited field of view. If they zoom in too closely, the context of the meeting room is lost; if they zoom out too far, people's expressions become invisible. Second, because the controlling motor takes time to move the camera, the camera's response to the meeting (e.g., switching between speakers) is slow. In fact, PTZ cameras cannot move too much or too fast, otherwise people watching the meeting can be quite distracted by the noise and motion of the camera as it adjusts its viewpoint.

Given these drawbacks and recent technological advances in mirror/prism-based omni-directional vision sensors, researchers have started to rethink the way video is captured and analyzed. For example, BeHere™ Corporation provides 360° Internet video technology in entertainment, news and sports webcasts. With its interface, remote users can control personalized 360° camera angles independent of other viewers to gain a "be here" experience. While this approach overcomes the two difficulties of limited field of view and slow camera response faced by the PTZ cameras, these types of devices tend to be too expensive to build given today's technology and market demand. In addition, these mirror prism-based omni-directional cameras suffer from low resolution (even with 1 MP sensors) and defocusing problems, which result in inferior video quality.

In another approach, multiple inexpensive cameras or video sensors are assembled to form an omni-directional camera array. For example, one known system employs four National Television System Committee (NTSC) cameras to construct a panoramic view of a meeting room. However, there are disadvantages with this design. First, NTSC cameras provide a relatively low quality video signal. In addition, the four cameras require four video capture boards to digitize the signal before it can be analyzed, transmitted or recorded. The requirement for four video capturing boards increases the cost and complexity of such a system, and makes it more difficult to manufacture and maintain. Another issue with these types of cameras is that they tend to be larger and when placed in the middle of a conference table they can be obtrusive and block the meeting participants views of each other due to their larger size.

Other camera systems have employed mirrors to achieve 360 degree coverage of a meeting room by creating camera arrays wherein the cameras are disposed in a back-to-back circular fashion directed at a number of mirrors which results in a common virtual center of projection. That is, the effective distance D between the centers of projections of all of the cameras in the array, is zero. The distance D can be modified by varying the angle at which a given mirror is positioned relative a given camera. The center of projection of a camera is defined as point of which one can rotate the camera around and only get a rotational transformation, and no translational transformation. For camera systems employing mirrors, the virtual center of projection corresponds to where the center of projection of the camera would have to be if there was no mirror to capture the same portion of the surrounding scene. When the virtual center of projection for all cameras in the array is common, there is no parallax error, no matter how far or how close the surrounding objects to be captured are from the camera. The goal for these camera arrays employing mirrors is to provide a seamless panorama. In this type of camera array, images must be stitched together to create a panoramic view of the area photographed. Having no parallax error allows the images to be readily stitched with no ghosting or other errors. When the common virtual center of projection is zero, however, these camera systems are usually quite large, because in order to obtain the aforementioned common center of projection it is typically necessary to employ very large mirrors. This makes this type of camera undesirable for video conferencing applications because when placing it in the center of a conference room table it is obtrusive and annoying to meeting participants. An example of such a camera system employing mirrors with a common virtual center of projection was Circarama™, a special presentation system that was used at Disneyland®. The spectators stood in the middle of a circle viewing a 360-degree panorama on a surround screen 8 feet high and 40 feet in diameter made up of eleven panels. The original negatives were made on eleven 16 mm cameras arranged in a concentric circle. The prints were projected by a ring of interlocked 16 mm projectors. In that camera, the mirrors are used to create a virtual center of projection for each camera, which is identical for each camera.

SUMMARY

The invention is directed towards a camera design and process that overcomes the aforementioned limitations in videoconferencing cameras by employing an omni-directional camera array that is very small and unobtrusive and allows for higher pixel resolution to produce a clear image of the faces of meeting participants sitting or standing around a conference room table, as well as other objects in this distance range, as would be typical in a video conferencing situation.

The camera system of the invention uses N cameras and an N sided mirror to capture images of the surrounding scene. The images from the N cameras are stitched together to create a 360-degree panorama using a calibration surface. The camera system according to the invention uses the N-sided mirror to create a camera array with a very small distance D between the virtual centers of projections of the cameras in the array. This distance D is a non-zero value, however.

To stitch the images together in real-time, a static image stitcher is used, which stitches images together perfectly for objects on a calibration surface. The calibration surface is typically defined by the boundary of the table the camera is sitting on.

It should be noted that objects not near the calibration surface exhibit stitching errors. The distance that the object can move away from the calibration surface without significant stitching errors (e.g., more than 1 pixel) is called the "depth of field without parallax error". This depth of field without parallax error is a function of the distance between adjacent cameras' centers of projection or the distance between adjacent cameras' virtual centers of projection in cameras employing a mirror. To minimize error in the panoramic image, adjacent cameras should have a minimal distance D between their centers of projection. Ideally the cameras all have an identical center of projection, or virtual centers of projection, which can be achieved using a mirror system like the Circarama camera (1955, Disney) and CircleVision (1967, Disney). However, in order for each camera to have an identical virtual center of projection, it would be necessary to use large mirrors. As mentioned previously, large mirrors are undesirable for video-conferencing purposes as the camera array should be very small and unobtrusive when it sits in the center of a conference room table.

However, it is not necessary to have an identical center of projection, or virtual center of projection, if the distance between the camera and objects of interest is restricted. This is the case in most video-conferencing applications where the size of the conference room table, and typically the conference room, is limited. For most conference rooms, it is sufficient to have the distance between adjacent virtual centers of projection be less than 3 mm (assuming pixel sizes of 6.2×6.2 µm and a Bayer color filter array). By using domain knowledge of the typical conference room table size and so relaxing the constraint of the distance D between adjacent camera's virtual centers of projection, the total camera system size can be made significantly smaller. A smaller camera is desirable as it becomes less obtrusive and is less expensive to build. The invention employs this principle to create a small camera system that can be used for video conferencing.

An additional feature of the camera system is the cameras are tilted up slightly to achieve an increased vertical field of view. This configuration images less of the table, and allows imaging of people standing near the table, or sitting around it, at higher resolutions. This configuration maximizes the use of the imaging sensors, further reducing cost of the system. More specifically, cameras with a smaller vertical field of view can be used as almost the entire field of view captures the video conference participants' faces and not extraneous data such as the surface the camera is sitting on. Cameras with a larger field of view require higher resolution sensors to achieve similar performance.

Thus, the camera system and method according to the invention is advantageous in that it is very small, inexpensive to manufacture and provides a greater pixel resolution to areas of interest such as the video conference's participant's faces instead of background areas.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
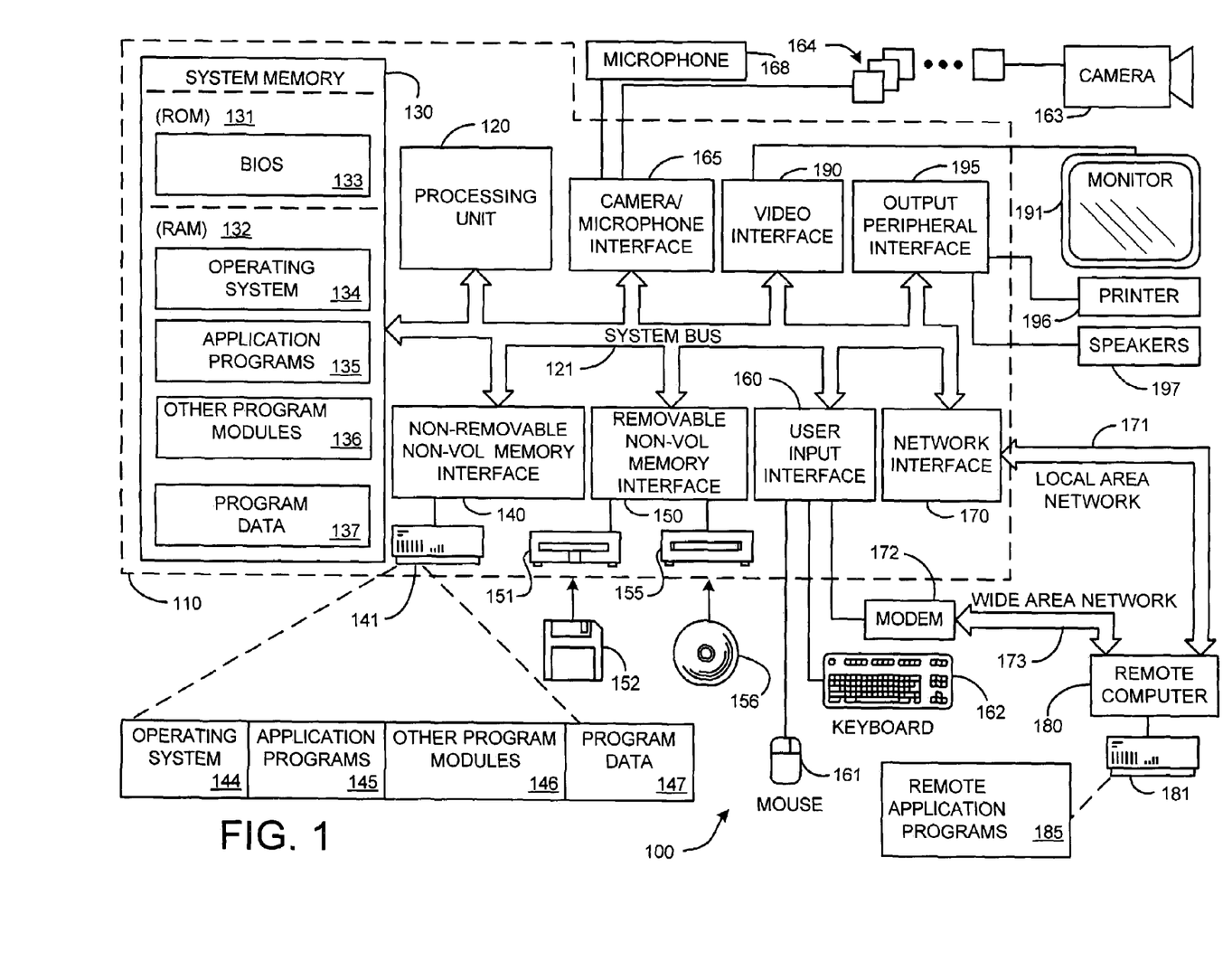
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Omni-Directional Camera Design for Video Conferencing.

The following sections describe the geometry of the camera system according to the invention, the distances between adjacent cameras virtual centers of projection, the determination of a calibration surface for image stitching and the image stitching process itself:

2.1 Camera/Reflective Surface Geometry.

Figure 2:
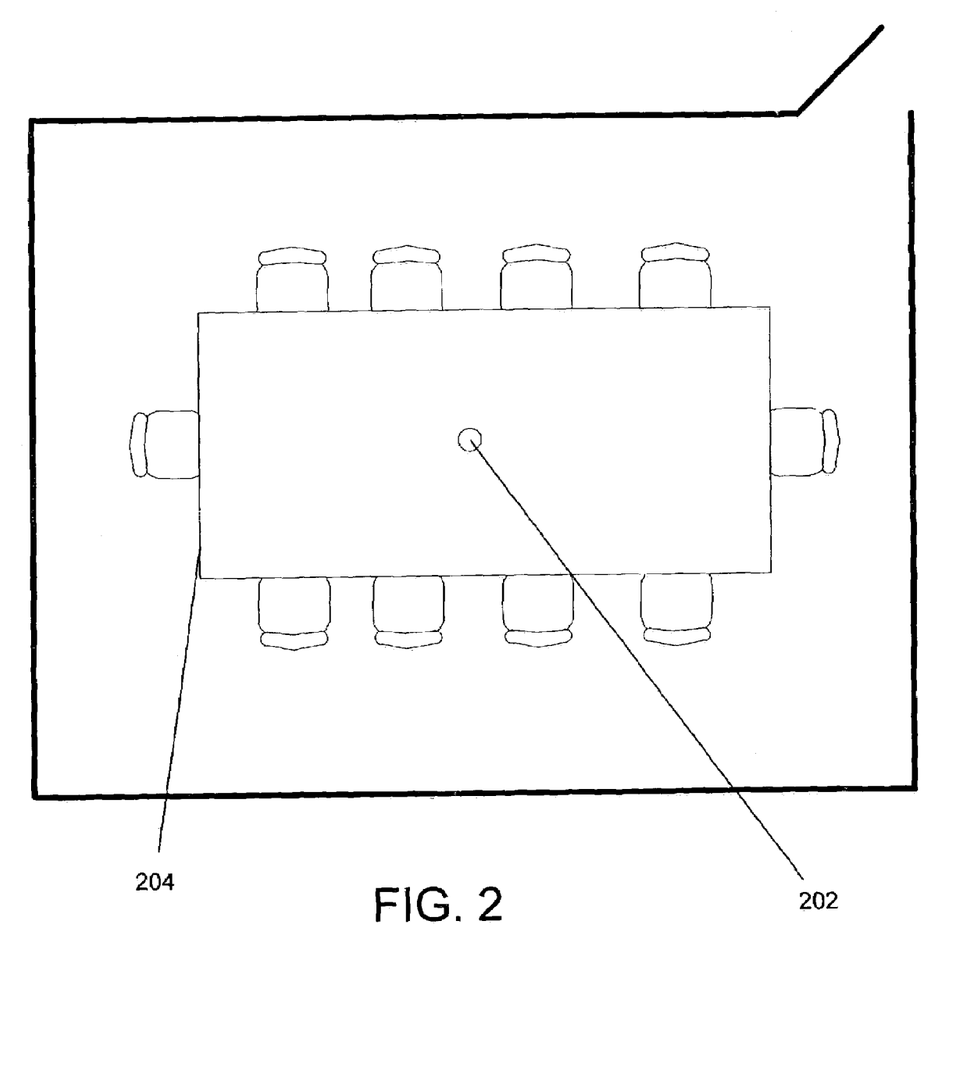
FIG. 2 is an exemplary diagram depicting the camera system according to the invention placed in the center of a conference room table.

In general, the camera design of the invention employs a number of cameras directed at a multi-sided mirror or a similar multi-sided reflective surface, each camera being pointed at one side of the multi-sided mirror at an upward angle to provide omni-directional coverage of a given space such as the space around a conference room table. The camera 202 is designed to sit in the middle of a conference room table 204, as shown in FIG. 2, and to capture images of people participating in a video conference.

Figure 3:
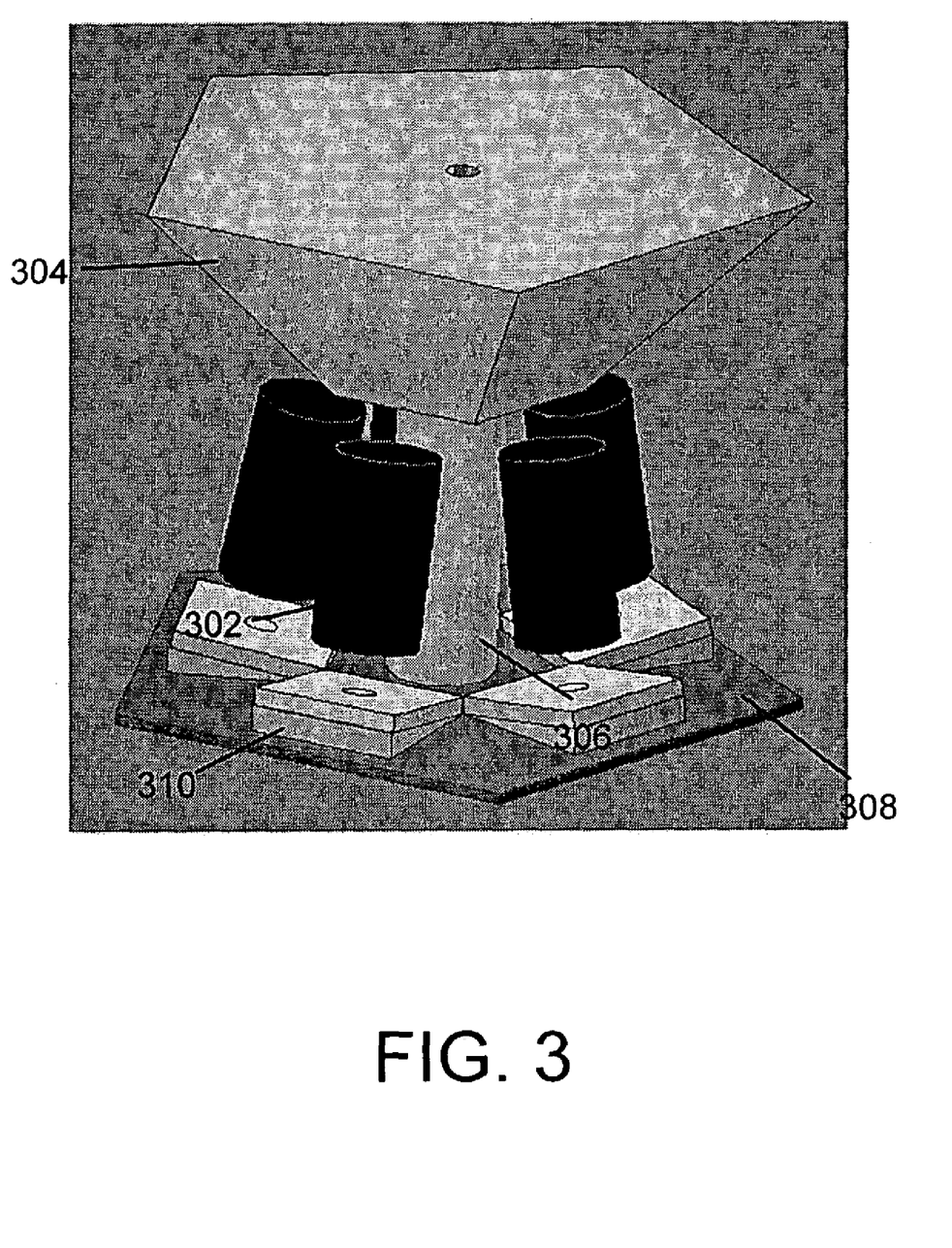
FIG. 3 is a diagram depicting a camera and mirror system. In this embodiment a 5-sided mirror and five cameras are used.
Figure 4:
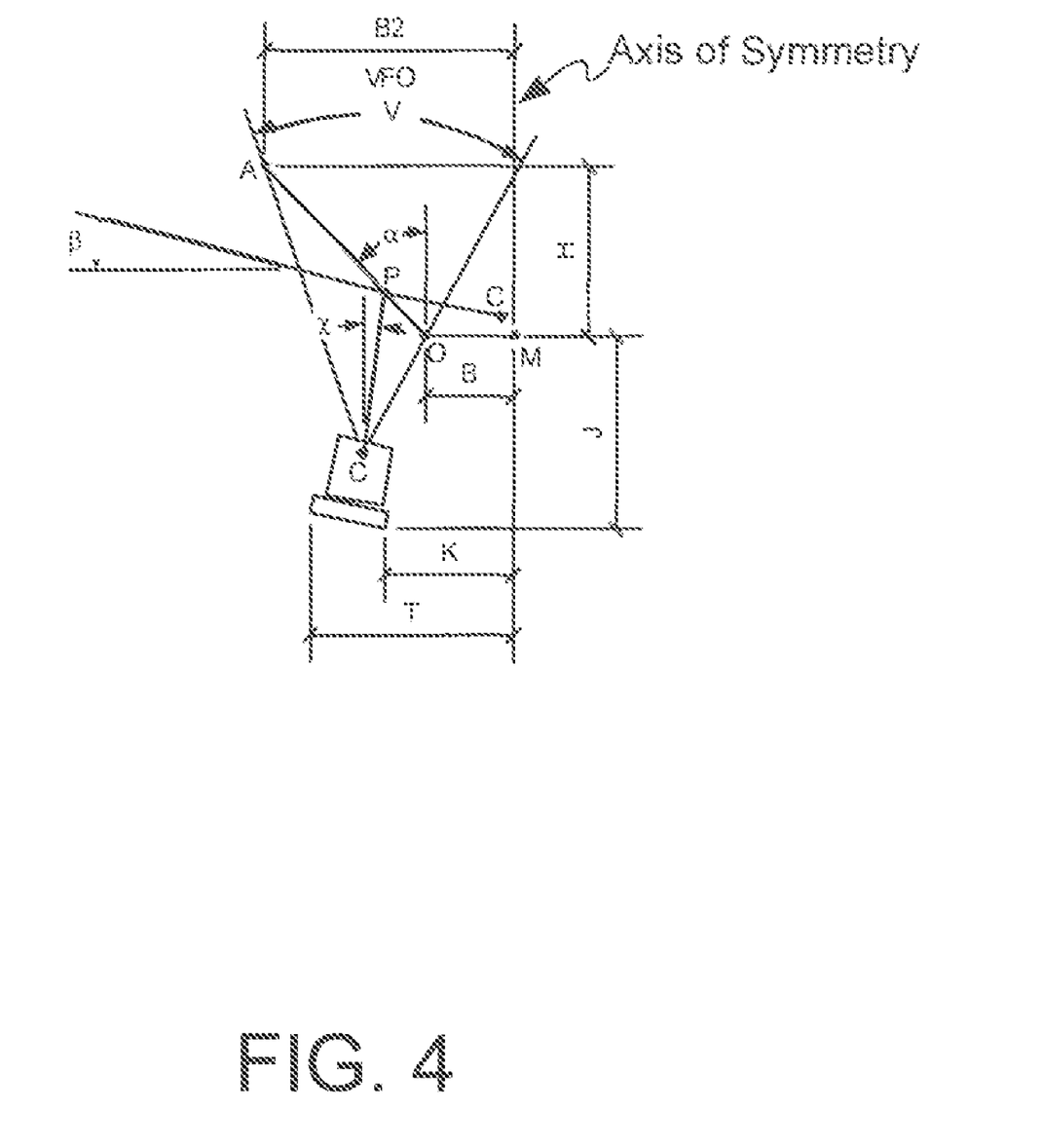
FIG. 4 is a diagram depicting a camera and mirror system. A single camera is shown with center of projection C with virtual center of projection C'.
Figure 5:
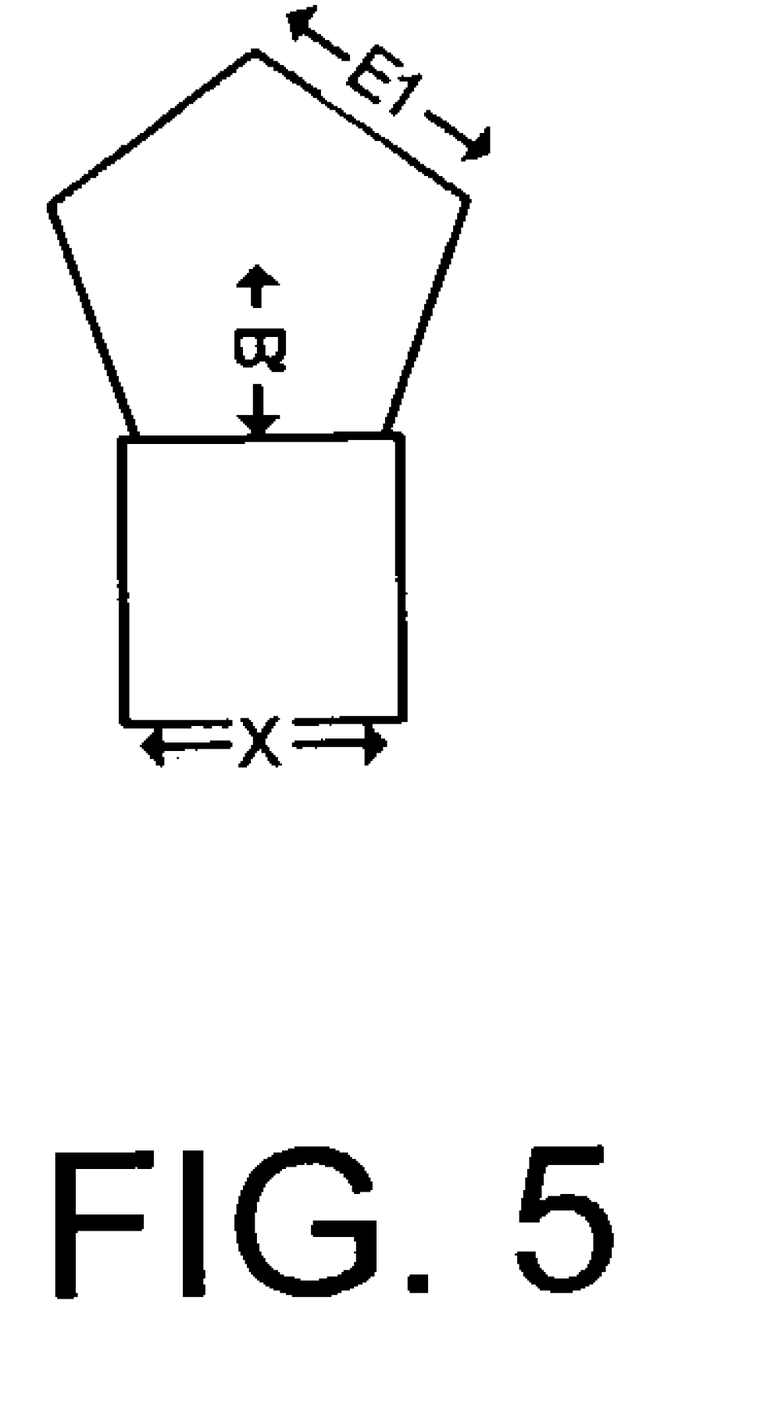
FIG. 5 is a diagram depicting a bottom view of the base of packed camera sensors. The sensor chip width is X, and pentagon mirror side length is E1.

More specifically, the camera design of the invention employs N cameras and an N sided mirror, as shown in FIGS. 3, 4 and 5. FIG. 3 depicts an embodiment of the camera 302 wherein a 5-sided mirror is used. Different numbers of mirrors/reflective surfaces and cameras can be used, as long as there is a one-to-one correspondence for each camera-mirror pair. In FIG. 3, camera 302 is aligned with mirror side 304. Each camera captures the image that is reflected in its corresponding mirror or reflective surface. The N-sided mirror may be held above the cameras by a rod or other mounting device 306 to provide an increased vertical field of view that captures the meeting participants sitting around the meeting room table or standing near it.

However, in one embodiment this rod or mounting device 306 is not employed and the cameras are mounted directly to the base. In the embodiment of the invention shown in FIG. 3, each of the reflective sides preferably forms a 41 degree angle with a plane parallel to the base 308, and each camera forms a 6 degree angle with a plane parallel to the base 308. This arrangement allows for a small camera head size and a field of view that is 6 degrees above the horizon.

Each camera in this five-sided mirror embodiment has an effective 72 degree field of view in the horizontal direction. It should be noted that the actual field of view of each camera should be slightly larger to allow for image overlap between adjacent cameras to facilitate the stitching of the images into a panoramic image. The vertical field of view is governed by the tilt angle of the camera relative to its corresponding reflective surface, the angle of the reflective surface, as well as the height of the rod. Since there are five cameras in this embodiment, the total horizontal view provided by the camera array is 360 degrees. If N were a different number, however, then the horizontal field of view of each camera could be adjusted accordingly. For instance, if there were four cameras with four corresponding reflective surfaces, the field of view for each camera should preferably be approximately 90 degrees to achieve 360-degree coverage in the horizontal plane. Similarly, if six cameras and corresponding mirrors were employed then the field of each camera should be approximately 60 degrees to achieve 360-degree coverage. Hence, it can be seen that the number of reflective surfaces and cameras can be readily varied to achieve 360-degree coverage. Additionally, if less than 360-degree coverage is sought (e.g., all meeting participants are to be seated on one side of a conference room table), then the number of cameras and reflective surfaces could be configured accordingly. For example, for a 180-degree viewpoint three mirrors and three cameras with a 60-degree effective field of view in the horizontal plane could be employed.

The geometry of the camera configuration of the present invention can be described by the variables shown in Table 1, FIGS. 4 and 5, and the equations below. The variables in Table 1 correspond to the FIGS. 4 and 5. FIG. 5 is a diagram depicting the base of packed camera sensors. The sensor chip width is X, and pentagon mirror side length is E1.

TABLE 1

Variables used in FIGS. 4 and 5.

| Variable | Description |
| --- | --- |
| α | Angle of the mirror face and the vertical |
| χ | Tilt of camera with respect to the vertical |
| β | Angle between camera center axis and the horizon |
| A | Top edge of mirror |
| B | Horizontal distance between O and M, radius of bottom |
| B' | Radius of bottom mirror |
| B2 | Horizontal distance between A and M, radius of top |
| BFL | Back focal length |
| C | Center of projection of camera |
| C' | Virtual center of projection of camera |
| CD | Distance from center of projection C and outer lens |
| CH | Sensor Chip height |
| CW | Distance between center of projection C and PCB |
| $C_X$ | X coordinate of C |
| $C_Y$ | Y coordinate of C |
| E1 | Length of bottom mirror edge |
| E2 | Length of top mirror edge |
| H | Height of mirror system |
| HFOV | Horizontal field of view |
| J | Vertical distance between mirror base and camera base |

TABLE 1-continued

Variables used in FIGS. 4 and 5.

| Variable | Description |
|---|---|
| K | Horizontal distance between mirror center and right camera base |
| L | Length of lens |
| O | Bottom edge of mirror (origin) |
| P | Intersection of camera center axis and mirror |
| $P_X$ | X coordinate of P |
| $P_Y$ | Y coordinate of P |
| Q | Half sensor chip width |
| T | Horizontal distance between mirror center and left camera base |
| VFOV | Vertical field of view |
| X | Image sensor chip width with boundary |
| $M_X$ | X coordinate of M |
| M | Intersection of bottom plane of mirror and axis of symmetry |
| PE1 | Projected image length on bottom mirror edge |
| PE2 | Projected image length on top mirror edge |

The equations below relate to the camera geometry and define how given certain set of input variables, such as for example camera angles and mirror height, the other applicable parameters can be calculated in the camera design. The more important parameters that are calculated in determining the optimum configuration for the camera for video conferencing are the height of mirror system H, the angle between the center axis of the camera and the horizon β, and the distance between the virtual centers of projection, $C'_{dist}$.

In order to solve for the optimum height of the mirror, and the distance between virtual centers of projection of adjacent cameras, the angle β between the camera center axis and the horizon can be calculated as follows:

$$\beta = 90 - (2\alpha + \chi)$$

where α is the angle of the mirror face and the vertical, and χ is the tilt of camera with respect to the vertical. The distance between the center of projection C and the bottom edge of the mirror, O, is calculated as:

$$CO = C_x / \cos(90 - (VFOV/2 + \chi))$$

where $C_x$ is the x coordinate of the center projection and VFOV is the vertical field of view. This yields the y coordinate of the center of projection, $C'_y$, as:

$$C_y = \sqrt{CO^2 - C_x^2}$$

The angles COP and CAO can be calculated as $$COP = 180 - (\alpha + VFOV/2 + \chi)$$

$$CAO = 180 - (VFOV + COP)$$

The distance between the top and bottom of the mirrors is:

$$AO = CO * \sin(VFOV) / \sin(CAO)$$

which yields the height of the mirror system, H, is:

$$H = \cos(\alpha) * AO.$$

A series of calculations yield the coordinates of the intersection of camera center axis and mirror $P_x$, $P_y$ $$CPO = 180 - (COP + VFOV/2)$$

$$PO = CO * \sin(VFOV/2) / \sin(CPO)$$

$$P_x = PO * \sin(\alpha)$$

$$P_y = PO * \cos(\alpha)$$

Once $P_x$, $P_y$, are found it is possible to find the x, and y coordinates of the virtual center of projection, $C'_x$, $C'_y$ of a given camera as, $$PC = PO * \sin(COP) / \sin(VFOV/2)$$

$$PC' = PC$$

$$C'_x = PC'* \cos(\beta) - P_x$$

$$C'_y = P_y - PC'* \sin(\beta)$$

where PC is the distance between the point of intersection of the camera center axis and the mirror and the center of projection of the camera.

Performing these calculations for a set of adjacent cameras, yields the distance between the virtual centers of projection, $C'_{dist}$, for the set as, $$M_x = B$$

$$C'_x M_x = C'_x - M_x$$

$$C'_{dist} = 2 * C'_x M_x * \sin(36).$$

where $M_x$ is the x coordinate of the intersection of the bottom plane of the mirror and the axis of symmetry and B is the horizontal distance between the bottom edge of the mirror and the intersection of the bottom plane of the mirror and the axis of symmetry.

Other parameters that are useful in designing a specific embodiment of the camera system include, the radius of the top, B2, which can be defined as:

$$B2 = B + H / \tan(\alpha);$$

and the lengths of the bottom and top mirror edges, E1, E2, which are given by:

$$E1 = 2 * \tan(36) * B$$

$$E2 = 2 * \tan(36) * B2.$$

The projected image length on the bottom and top mirror edges can be calculated as:

$$PE1 = CO * \sin(HFOV/2) * 2$$

$$PE2 = AC * \sin(HFOV/2) * 2."$$

Similarly, the vertical distance between the mirror base and the camera base, J, is given by:

$$J = CW * \cos(\chi) + \sin(\chi) * Q + C_y.$$

Finally, the horizontal distance between the mirror center and the right camera base, K, and the horizontal distance between the mirror center and the left camera base, T, is given by:

$$K = C_x - (Q * \cos(\chi) - CW * \sin(\chi)) + B$$

$$T = K + X * \cos(\chi).$$

In a tested embodiment of the invention, the foregoing equations were used to find the parameters needed to configure the omni-directional camera which satisfy the constraints of β=6 degrees; a minimal height of the mirror system H; a minimal top radius B2; and a distance between the virtual centers of projection of $C'_{dist}$<3 mm. In addition, the constraints of the projected image length on bottom mirror edge being less than the length of bottom mirror edge (PE1<E1) and the projected image length on the top of the mirror edge being less than the length of the top mirror edge (PE2<E2) were also imposed. The value of β=6 degrees was selected as the angle that the cameras are tilted upward from the horizon and $C'_{dist}$<3 mm was selected to provide virtual center of projections in close enough to avoid stitching errors (see FIG. 8). It should be noted, however, that different values, depending on the camera height, sensors, and so on, can be used.

Referring again to FIG. 4, it can be seen how the Vertical Field of View (VFOV) is influenced by the tilt angle β of the camera. As shown in FIG. 3, this tilt angle β is dictated by the angle of a wedge 310, though other tilting means of acquiring this camera angle relative to the mirror can be used. In one embodiment of the invention, it is preferred that this angle be between 6 and 8 degrees.

As mentioned above, the additional feature of the camera system that the cameras are tilted up slightly (see FIGS. 3 and 4) achieves an increased vertical field of view. This configuration images less of the table, and concentrates on the imaging of people sitting around and standing near the table, as well as other objects in this range, in a typical conference room (see FIG. 6). This configuration maximizes the use of the imaging sensors, further reducing cost of the system.

Figure 6:
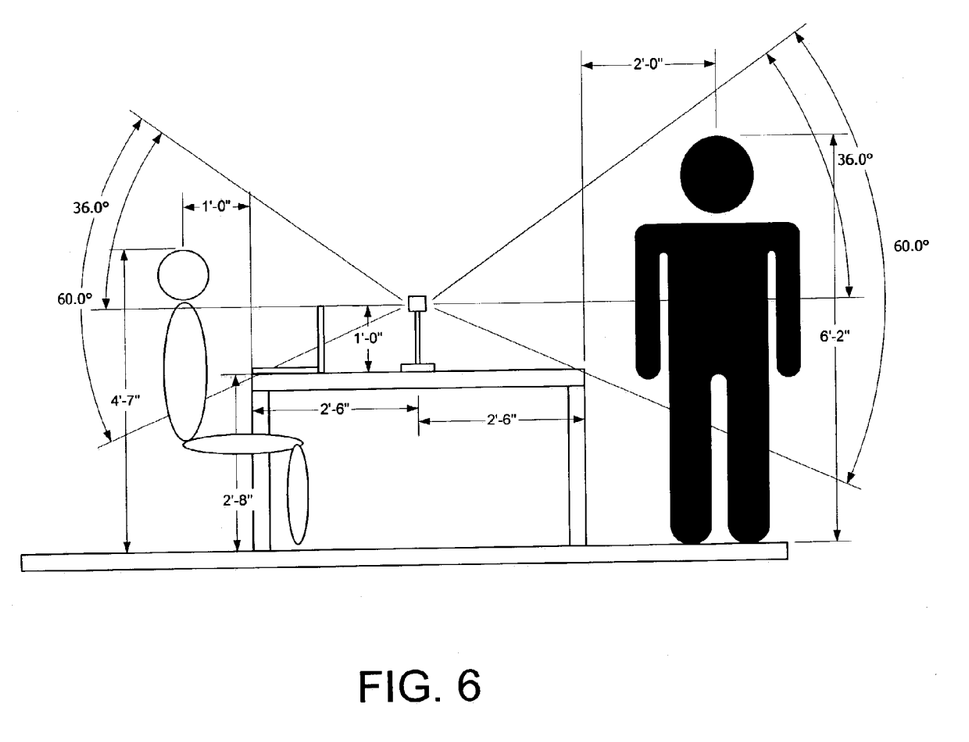
FIG. 6 depicts an exemplary camera system configuration in a conference room.

FIG. 6 shows a typical conference room that employs one exemplary embodiment of the camera design of the invention. As shown in FIG. 6, the camera array 602, sits in the middle of a conference room table 604. The camera array positioned a given distance from the table surface has a vertical field of view that covers both a person's head 606 when the person is sitting around the table and a 6'2" person 608 that is standing next to the table 604.

In the exemplary embodiment shown in FIG. 6, the camera array is approximately 9 inches above the table surface and the vertical field of view is approximately 60 degrees. In this configuration, the vertical field of view captures mostly the people standing or sitting around the table and not the table surface itself. This is in part due to the camera array being elevated above the table by the rod or other mounting device. Additionally, since the camera array is omni-directional in the horizontal plane, the camera captures everyone that is sitting around the table or standing near it within the full 360 degree-work space.

2.2 Calibration Surface.

The images captured by the N cameras are stitched together to create a 360-degree panorama. To stitch the images together in real-time, a static image stitcher is used, which stitches images together perfectly for objects on a calibration surface. The calibration surface is typically defined by the boundary of the table the camera is on. However, objects not near this calibration or stitching surface exhibit stitching errors such as image ghosting. The distance that the object can move away from the calibration surface without stitching errors is called the "depth of field without parallax error". This depth of field is a function of the distance D between adjacent camera's centers of projection, and is plotted in FIG. 8. This graph shows the depth of field without parallax error for a camera calibrated on an object 1.2 meter away. Note that if the camera baseline (distance between centers of projections for adjacent cameras) is 3 mm, then the object can be between 0.6 and 30 meters from the camera with less than one pixel parallax error.

Hence, to minimize error in the panoramic image, adjacent cameras should have a minimal distance between their centers of projection. As indicated previously, ideally all of the cameras should have an identical center of projection. However, this is not possible without very large mirrors.

Figure 8:
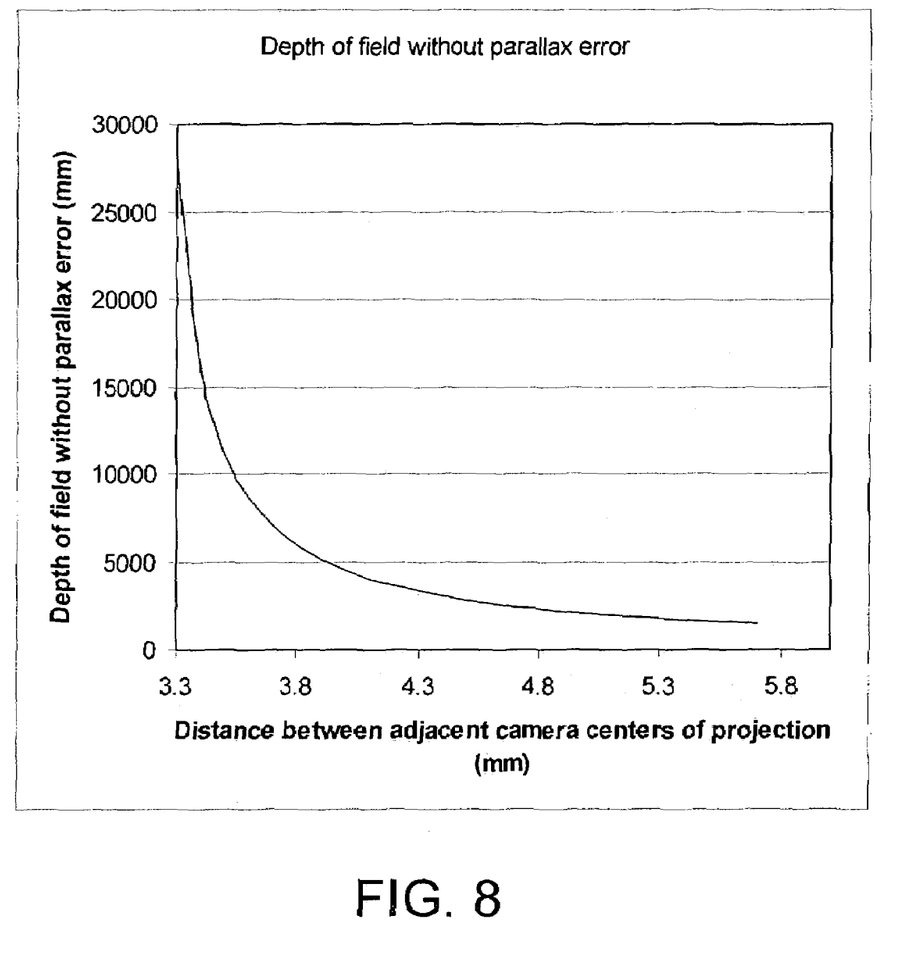
FIG. 8 shows the depth of field without parallax error for a camera calibrated on an object 1.2 meters away. Note that if the distance between adjacent camera centers of projections is 3.3 mm, then the object can be between 0.6 and 25 meters from the camera with less than one pixel parallax error (assuming a 6.2×6.2 µm pixel size and Bayer color filter array).

It is, however, not necessary to have an identical center of projection if the distance between the camera and objects of interest are restricted (i.e., contained within the depth of field without parallax error), as the graph in FIG. 8 shows. Using this data, it can be seen that for most conference rooms, it is sufficient to have the distance between adjacent centers of projection be less than 10 mm. By relaxing the constraint of the distance between adjacent camera's centers of projection by using a restricted calibration surface, one can make the omni-directional camera size significantly smaller. A smaller camera is desirable as it is less obtrusive and is less expensive to build.

In one embodiment of the invention, a distance is prescribed for each camera in order to establish the calibration surface. In the case of a conference room, this prescribed distance could correspond to the distance from the camera array to the edge of a conference room table. A calibration surface is established using a pattern created by a small array of LEDs placed at the prescribed distances from the cameras (e.g., around the edge of the conference table). More specifically, the LEDs are used to determine the scale and rotation between cameras by providing point-to-point correspondence between images captured by adjacent cameras that are easy to compute. These parameters are then used to generate a mapping table, mapping corresponding pixels between the images captured in one camera and the adjacent cameras in the overlapping regions, i.e. a table listing the pixels of one camera and the corresponding pixels of the other camera(s). The mapping table speeds up processing as the pixel correspondences do not have to be recomputed each time new images are captured in order to create a panorama. The result of the calibration is an image remapping function, which remaps a camera image into the panorama.

It is noted that in another embodiment of the invention, the distances used to establish the calibration surface for image stitching could be user-defined. If this distance is measured by a user, it only has to be measured once until the camera array is moved.

2.3 Computing the Parallax Error About the Calibration Surface.

Figure 7:
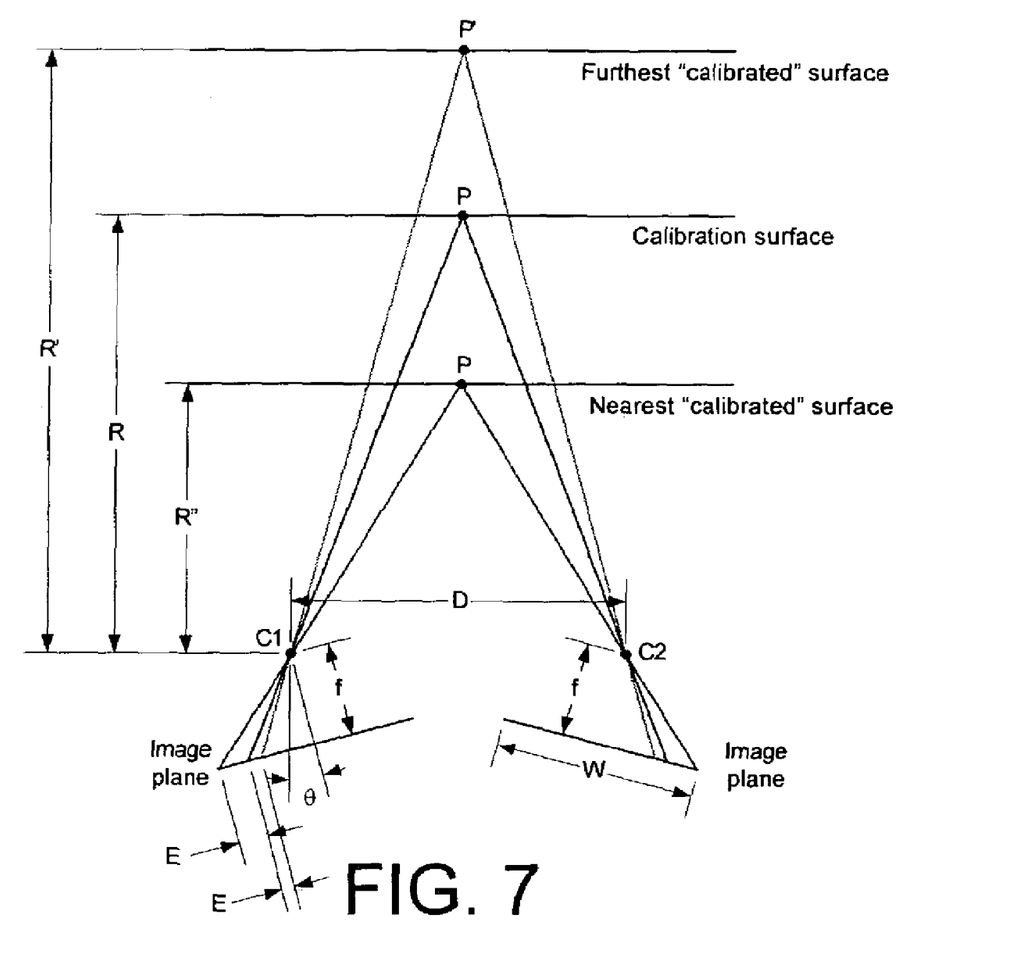
FIG. 7 is a diagram depicting the parallax error parameters. C1 and C2 are the centers of projection (or virtual centers of projection), f the focal length, and W the width of the image sensor. For 5 cameras, the field of view, θ, is 36°.

The aforementioned depth of field without parallax error for a particular camera configuration can be computed as follows. Consider the camera configuration in FIG. 7. As discussed previously, the center of projection in each camera, $C_1$ and $C_2$, is the point between the CCD and outer lens such that rotations about this point result in a pure rotation transformation on images captured (i.e., no motion parallax is induced). The distance between these centers of projection is labeled D. If D were zero, then stitching the images together is relatively easy. However, if D is not zero then motion parallax in the captured images is introduced. As a result, stitching the images together seamlessly requires knowing the depth from the cameras to the object being stitched. Computing reliable object depth with stereo image pairs is a very difficult problem, and has not been solved generally (for arbitrary objects, texture, lighting, etc.). Parallax motion can be minimized by minimizing D. In this figure $f$ is the focal length and W is the width of the sensor. FIG. 7 shows two adjacent cameras in the camera system according to the invention. The variables in this figure are summarized in Table 2 below. The furthest calibrated surface is the furthest surface a point P' is still calibrated, given it was calibrated at P. Likewise, the nearest calibrated surface is the nearest surface at point P" that is still calibrated, given it was calibrated at P. The virtual centers of projection can be calculated as described in Section 2.1. The parallax errors at the nearest and furthest calibrated point can also be calculated as discussed below.

TABLE 2

Variables Used in FIG. 7

| Variable | Description |
|---|---|
| F | Focal length of camera |
| D | Distance between center of projections |
| θ | Field of view |
| R | Distance from center of projection and calibration surface |
| R' | Distance from center of projection and furthest calibrated surface |
| R" | Distance from center of projection and nearest calibrated surface |
| E' | Parallax error at furthest calibrated point |
| E" | Parallax error at nearest calibrated point |
| W | Image sensor width |

In calculating the parallax error at the nearest calibrated point, E", and the parallax error at the farthest calibrated point, E', the following equations are useful.

$$E'' = \frac{f \cdot D}{\cos(\theta)}\left(\frac{1}{R''} - \frac{1}{R}\right)$$

$$E' = \frac{f \cdot D}{\cos(\theta)}\left(\frac{1}{R} - \frac{1}{R'}\right)$$

where R is the distance between the center of projection of the camera and calibration surface, R' is the distance between the center of projection of the camera and the furthest calibrated surface, and R" is the distance between the center of projection of the camera and the nearest calibrated surface. The angle θ is the camera field of view, f is the focal length and D is the distance between adjacent cameras centers of projections.

Thus, to determine the "depth of field without parallax error for a given distance R, one sets E' and E" to the pixel size or some acceptable value and compute R' and R".

2.4 Image Stitching.

Once the calibration surface has been determined, the images can be stitched together seamlessly for the aforementioned predefined or user-specified distances with a conventional static stitcher using the computed calibration surface map. The stitcher is essentially an image remapping function, and maps pixels from each camera to a destination on the panoramic image. Image interpolation (e.g., bicubic) is used since the destination coordinate is usually not an integer (x,y) coordinate. For overlap regions in which two images contribute to the same area in the panorama, these pixels can be cross-faded or blended via any other conventional method.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A camera system comprising:
an N-sided reflective surface that reflects its surroundings in 360 degrees;
N cameras each associated with a different side of said N-sided reflective surface, and aligned to have a small non-zero distance between virtual centers of projection relative to each other which provides minimal parallax error at a predefined distance from the cameras, each of N cameras aligned to capture a reflected image in its associated reflective surface; and
an image stitcher for stitching each of said reflected images taken by adjacent cameras together to create a panoramic image.

2. The camera system of claim 1 wherein said N cameras are tilted upward relative to the horizontal to capture an increased vertical field of view.

3. The camera system of claim 1 wherein said N cameras are tilted to capture a desired part of a scene.

4. The camera system of claim 3 wherein said N cameras each associated with a different side of said N-sided reflective surface are tilted upward in the range from six to eight degrees to capture a desired scene of objects that it is desired to capture while still being able to minimize the vertical field of view.

5. The camera system of claim 1 further comprising a mounting rod positioning said N-sided reflective surface above said N cameras each associated with a different side of said N-sided reflective surface.

6. The camera system of claim 5 wherein said mounting rod positioning said N-sided reflective surface above said N cameras increases said vertical field of view of said N cameras.

7. The camera system of claim 1 wherein said N cameras capture 360 degrees in the horizontal plane.

8. The camera system of claim 1 wherein said image stitcher uses a calibration surface of constant depth to stitch images captured by said N cameras.

9. The camera system of claim 8 wherein said calibration surface is predefined.

10. The camera system of claim 8 wherein said calibration surface is user defined.

11. The camera system of claim 8 wherein said calibration surface is defined by:
marking a point in each of said images;
determining a point to point correspondence in said images captured by each of N cameras to determine corresponding pixels in overlapping regions of each of said images;
generating a mapping table that defines how the pixels of the image captured by each of said N cameras is to be stitched into a panoramic image.

12. The camera system of claim 11 wherein said mapping table speeds up processing of generating subsequent panoramic images by using said mapping table each time new images are captured as the pixel correspondences do not have to be recomputed each time new images are captured in order to create a panorama.

13. A process of capturing video for teleconferencing and meeting recording, comprising the following process actions
capturing images of an event in 360 degree with an omni-directional camera array, wherein said omni-directional camera comprises an N-sided mirror located above N cameras arranged to be equally spaced around the circumference of a circle in a circular fashion and tilted upward slightly from the horizontal plane, and positioned to have a small non-zero distance between their virtual centers of projection so as to provide minimal parallax error at a predefined distance from the cameras, each capturing an image reflected in a different side of said N-sided mirror; and stitching together said images captured by each of N cameras using a calibration surface to create a composite image.

14. The process of claim 13 wherein each of said N cameras is a video sensor.

15. The process of claim 13 wherein said camera system is placed on a table and wherein edges of said table are used to define said calibration surface.

16. The process of claim 13 wherein said calibration surface is user-defined.

17. The process of claim 13 wherein said calibration surface is located at one or more prescribed depths from said can era system.

18. The process of claim 13 wherein said calibration surface is determined by the process actions of:
   using a pattern created by a small array of LEDs placed at the prescribed distances from the cameras to determine the scale and translation between cameras by providing point-to-point correspondence between images captured by adjacent cameras;
   using said point-to-point correspondences to generate a mapping table, mapping corresponding pixels between the images captured in one camera and the adjacent cameras in the overlapping regions; and
   using said mapping table to determine pixel locations when stitching said images into a panoramic image.

19. The process of claim 13 wherein said N cameras are tilted upward to increase the vertical field of view for each camera.

20. The process of claim 13 wherein said N sided mirror is mounted on a rod above said cameras to increase each cameras vertical field of view.

21. The process of claim 19 wherein the tilt angle of said cameras is adjusted by adjusting the offset of the lens mount of the camera in the x and y directions.

22. A computer-readable medium having computer-executable instructions for viewing or recording a videoconference, said computer executable instructions comprising:
   capturing images of an event in 360 degree with an omni-directional camera array, wherein said omni-directional camera comprises an N-sided mirror located above N cameras arranged to be equally spaced around the circumference of a circle in a circular fashion and tilted upward slightly from the horizontal plane, and positioned to have a small non-zero distance between their virtual centers of projection so as to provide minimal parallax error at a predefined distance from the cameras, each capturing an image reflected in a different side of said N-sided mirror; and
   stitching together said images captured by each of N cameras using a calibration surface to create a composite image.

23. The computer-readable medium of claim 22 wherein mid instruction for stitching together said images captured by each of N cameras using a calibration surface comprises sub-instructions to determine said calibration surface, said sub-Instructions comprising:
   using a pattern created by a small any of LEDs placed at the prescribed distances from the cameras to determine the scale and translation between cameras by providing point-to-point correspondence between images captured by adjacent cameras;
   using said point-to-point correspondences to generate a mapping table, mapping corresponding pixels between the images captured in one camera and the adjacent cameras in the overlapping regions; and
   using said mapping table to determine pixel locations when stitching said images into a panoramic image.

* * * * *